June 19, 1951 — R. G. LE TOURNEAU — 2,557,444
FINAL DRIVE CONSTRUCTION FOR TRACTORS
Original Filed April 22, 1946 — 2 Sheets-Sheet 1

INVENTOR.
R. G. LeTourneau
BY
ATTYS

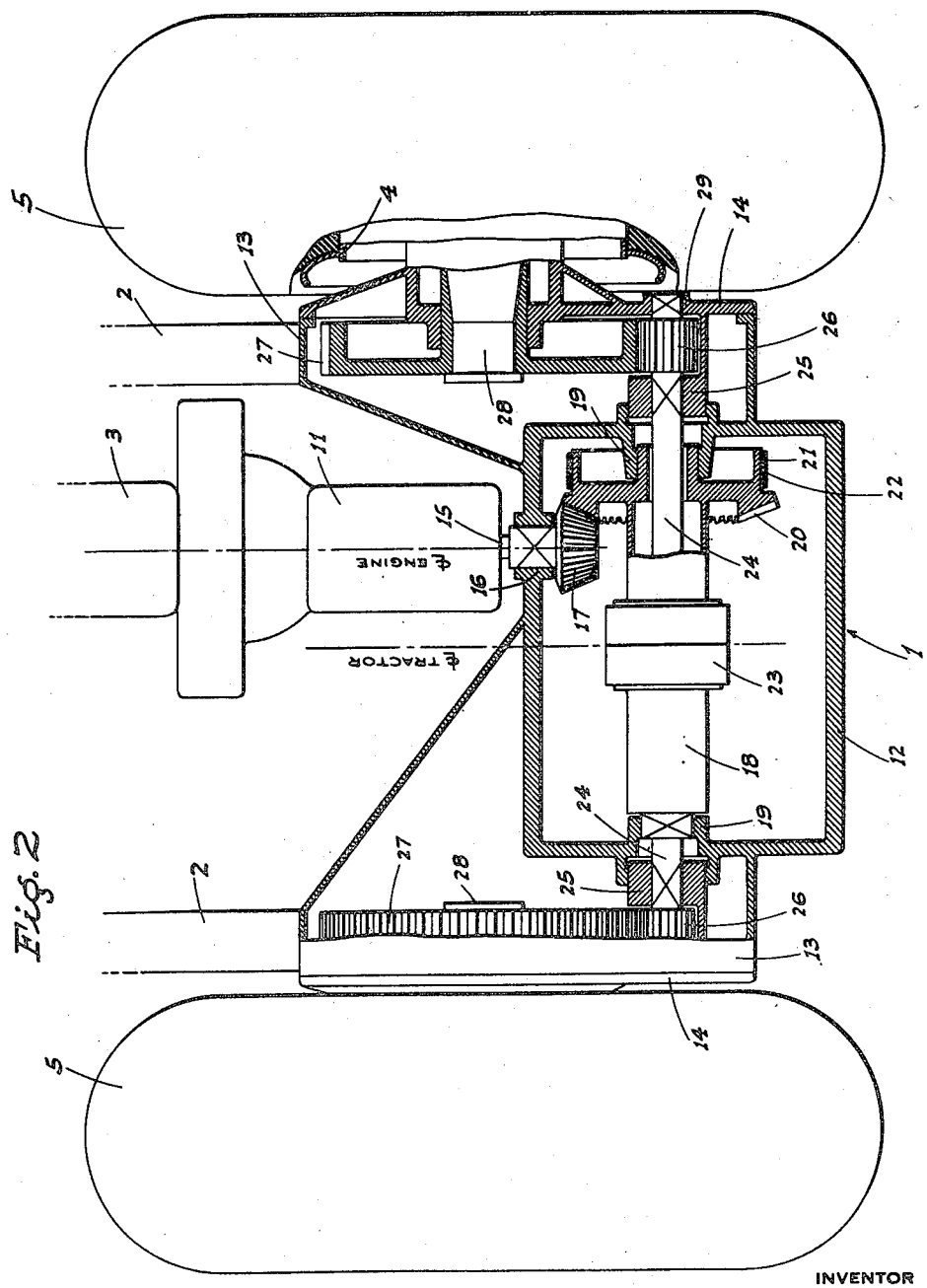

Patented June 19, 1951

2,557,444

UNITED STATES PATENT OFFICE 2,557,444

FINAL DRIVE CONSTRUCTION FOR TRACTORS

Robert G. Le Tourneau, Longview, Tex., assignor to R. G. Le Tourneau, Inc., Stockton, Calif., a corporation of California Original application April 22, 1946, Serial No. 664,079. Divided and this application September 17, 1948, Serial No. 49,751

4 Claims. (Cl. 180—75)

This invention is directed to, and it is an object to provide, a novel, final drive construction for tractors, the present application being a division of application Serial No. 664,079, filed April 22, 1946, on Two Wheel Tractor, now Patent No. 2,454,070, dated November 16, 1948.

Another object of the invention is to provide a final drive construction which is particularly adapted for use in a two wheel tractor coupled by a power steering unit to a trailing implement.

A further object of the invention is to provide a final drive construction which includes, in supporting relation to the driving instrumentalities, a novel housing or case assembly.

An additional object of the invention is to provide a final drive structure which is simplified but rugged in construction, and requires a minimum of maintenance and service.

A further object of the invention is to produce a practical and reliable final drive construction for tractors.

These objects are accomplished by means of such structure and relative arrangement of parts as will fully appear by a perusal of the following specification and claims.

In the drawings:

Figure 2 is a fragmentary, mainly diagrammatic plan view, illustrating the final drive construction in section.

Figure 1:
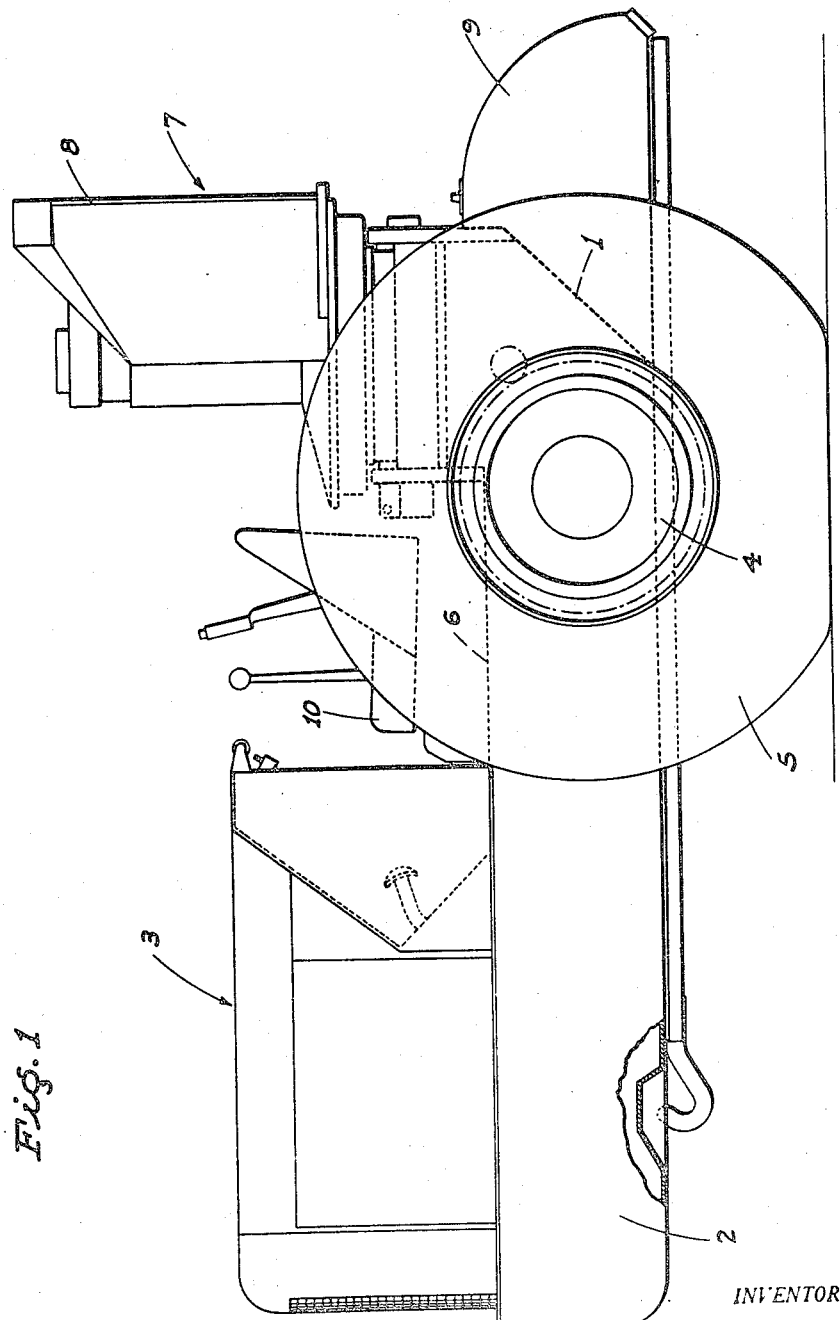
Figure 1 is a side elevation of a two-wheel tractor of the type in which the invention is embodied.

Referring now more particularly to the characters of reference on the drawings, the two-wheel tractor in which the invention is adapted to be embodied, comprises a final drive housing 1 of welded sheet steel and thus of heavy duty construction. Transversely spaced side beams 2 are fixed at the rear end to housing 1 and project forward in supporting relation to an engine unit 3 connected, in actuating relation, to the hereinafter described final drive.

The tractor is supported, adjacent but short of its rear end, by means of a pair of transversely spaced, ground engaging wheels 4 which carry large pneumatic tires 5 of high flotation type.

The top of the final drive housing 1 forms a rear deck 6, and an upstanding power steering unit 7 is mounted on said deck; such power steering unit serving also as a means to couple the tractor to a trailing implement, and for this purpose includes a rearwardly facing attachment head 8.

A fuel tank 9 may be mounted on and project rearwardly from the final drive housing 1, and the operator's seat 10 is mounted on the tractor between the engine unit 3 and the power steering unit 7.

The engine unit 3 drives rearwardly through a transmission 11 into a final drive assembly in the housing 1, as follows:

The final drive housing 1 includes a central case 12 and end cases 13 formed in rigid unitary relation therewith; said end cases 13 being provided with removable end plates 14. The drive shaft 15, from the transmission 11, extends into the central case 12 through a bearing 16, and within said case is fitted with a bevel pinion 17. Rearwardly of the bevel pinion 17 there is a horizontal, transversely extending drive sleeve 18 supported, at opposite ends, by bearing bosses 19 in the ends of the central case 12. Adjacent one end the sleeve 18 is fitted with a bevel drive gear 20 which includes thereon a brake drum 21 surrounded by a brake band unit 22, which brake band unit is under the control of the foot and hand brake accessible to the operator by linkage connections (not shown).

The drive sleeve 18 has a differential 23 interposed therein, and oppositely extending axles 24 lead from the differential 23 through the sleeve 18 and out of the central case 12 through bearings 25 in the ends of the latter.

Within the end cases 13 the axles 24 include drive pinions 26 which run in mesh with relatively large-diameter main gears 27 on laterally projecting wheel spindles 28 journaled in said end cases and projecting outwardly therefrom. The pneumatic-tired wheels 4 are secured on said spindles 28.

Outwardly of the pinions 26 the axles 24 are carried in bearings 29 in the end plates 14.

The described final drive construction is of simplified but durable design, and initial assembly thereof, as well as subsequent access for servicing or maintenance, is readily accomplished upon removal of the end plates 14; the interior of said central case 12 being accessible from the end cases 13 when the latter are open.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the fol- lowing is claimed as new and useful, and upon which Letters Patent are desired:

1. A final drive construction for a tractor, including a central case, a transverse drive sleeve in the central case, bearing means journaling the sleeve at opposite ends in connection with corresponding ends of the central case, a differential interposed in the drive sleeve intermediate its ends, the sleeve forming a part of the differential, axles responsive to the differential leading out of opposite ends of the sleeve and projecting laterally beyond opposite ends of the central case, a drive shaft entering the central case through a transverse wall thereof, a bevel pinion on the drive shaft in the central case, a gear on the sleeve driven by said bevel pinion, end cases beyond opposite ends of the central case, the axles extending into the end cases, spindle mounted wheels journaled in connection with the end cases and disposed laterally out therefrom, and wheel drive means in the end cases connected to and actuated by said axles.

2. A final drive construction for a tractor, including a central case, a transverse drive sleeve in the central case, bearing means journaling the sleeve at opposite ends in connection with corresponding ends of the central case, a differential interposed in the drive sleeve intermediate its ends, the sleeve forming a part of the differential, axles responsive to the differential leading out of opposite ends of the sleeve and projecting laterally beyond opposite ends of the central case, a drive shaft entering the central case through a transverse wall thereof, a bevel pinion on the drive shaft in the central case, a gear on the sleeve driven by said bevel pinion, end cases beyond opposite ends of the central case, the axles extending into the end cases, spindle mounted wheels journaled in connection with the end cases and disposed laterally out therefrom, a wheel drive gear in each end case, and a pinion in each end case on the axle and in mesh with the adjacent gear.

3. In a two-wheel tractor including a final drive housing having rigid side beams fixed thereon in transversely spaced, forwardly projecting relation, drive wheels mounted on the final drive housing to the sides of the latter, an engine supported by the side beams, a final drive assembly in said housing and coupled to the wheels, and driving connections between the engine and said final drive assembly; the final drive housing including, in unitary relation, a central case and end cases at opposite ends of the central case, and the final drive assembly comprising a transverse drive sleeve journaled at opposite ends in the central case, a gear on the sleeve, a driving pinion in mesh with the gear said pinion being driven by driving connections, a differential interposed in the sleeve, axles in the sleeve extending in opposite directions from the differential, said axles being journaled in corresponding ends of the central case and projecting into the adjacent end cases, a pinion on each axle in the corresponding end case, a wheel spindle in each end case and projecting laterally out thereof, the wheels being fixed on said spindles, and gear on each spindle within the end case driven by the adjacent pinion.

4. A final drive construction as in claim 1, including a brake unit mounted on the sleeve and operative to selectively effect a braking action directly on the sleeve.

ROBERT G. LE TOURNEAU.

REFERENCES CITED

The following references are of record in the file of this patent:

UNITED STATES PATENTS

| Number | Name | Date |
|---|---|---|
| 1,210,754 | Beatty | Jan. 2, 1917 |
| 1,810,635 | White | June 16, 1931 |
| 2,232,154 | Wagner | Feb. 18, 1941 |
| 2,247,668 | Rosenthal | July 1, 1941 |
| 2,268,601 | Knox | Jan. 6, 1942 |
| 2,345,351 | Maxon et al. | Mar. 28, 1944 |
| 2,361,935 | French | Nov. 7, 1944 |
| 2,378,615 | Brown | June 19, 1945 |
| 2,454,070 | Le Tourneau | Nov. 16, 1948 |